United States Patent

Ohta

(10) Patent No.: US 6,780,133 B2
(45) Date of Patent: Aug. 24, 2004

(54) DIFFERENTIAL GEAR

(75) Inventor: Yoshitaka Ohta, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/267,353

(22) Filed: Oct. 9, 2002

(65) Prior Publication Data

US 2003/0069105 A1 Apr. 10, 2003

(30) Foreign Application Priority Data

Oct. 10, 2001 (JP) .................................... 2001-312497

(51) Int. Cl.⁷ .............................................. F16H 15/48
(52) U.S. Cl. .................... 475/184; 475/196; 475/220; 74/650
(58) Field of Search ............................. 475/184, 196, 475/220; 74/650, 665 G

(56) References Cited

U.S. PATENT DOCUMENTS

| | | | | |
|---|---|---|---|---|
| 1,282,614 A | * | 10/1918 | Miller ........................ | 74/650 |
| 2,651,214 A | * | 9/1953 | Randall ...................... | 74/650 |
| 4,509,388 A | | 4/1985 | Tsiriggakis ................. | 74/650 |
| 4,867,009 A | * | 9/1989 | Hudson ....................... | 74/650 |
| 5,904,073 A | * | 5/1999 | Mimura ....................... | 74/650 |
| 6,039,672 A | * | 3/2000 | Bursal ........................ | 476/36 |

FOREIGN PATENT DOCUMENTS

JP           06213288 A   *   8/1994    .......... F16H/01/38

* cited by examiner

*Primary Examiner*—Charles A. Marmor
*Assistant Examiner*—David D. Le
(74) *Attorney, Agent, or Firm*—Adams & Wilks

(57) ABSTRACT

A differential gear includes a cylindrical power transmission member, two cam members accommodated in an inner space of the power transmission member, and a plurality of cam follower members. Each of the cam follower elements is fitted to a respective one of a plurality of engagement grooves, formed on an inner peripheral surface of the power transmission member in an axially longitudinal direction thereof, such that the each of the cam follower elements partially sticks out of the inner space. The stick-out portions of the cam follower elements are interposed between cam lobes formed on opposing surfaces of the two cam members. Drive power of the power transmission member is distributed to the two cam members via the cam follower elements.

11 Claims, 9 Drawing Sheets

DIFFERENTIAL GEAR

FIELD OF THE INVENTION

This invention relates to an improvement in a differential gear having a differential restricting function.

BACKGROUND OF THE INVENTION

A differential gear with a differential restricting function allows drive power to be distributed from a power transmitting member to two follower shafts while restricting these follower shafts from being rotated at speeds exceeding a given rotational difference. Such a differential gear is known from, for instance, U.S. Pat. No. 4,509,388 entitled "DIFFERENTIAL GEAR".

The differential gear set forth above is comprised of two opposing casing halves and a power transmission member composed of a crown gear disposed between these casing halves. Plural sets of two dish-like cams are disposed in an internal space between the casing halves and the power transmission member to be rotatable with respect to one another. The dish-like cams have follower shafts, respectively. The dish-like cams have an inner cam lobe and an outer cam lobe formed on mutually opposite surfaces of the respective dish-like cams at an area closer to the rotational center and a diametrically outer area, respectively. The inner cam lobe and the outer cam lobes are continuous in a circumferential peripheral direction. The inner cam lobes and the outer cam lobes vary in a radially outward direction. Four small rolling members are disposed between the inner cam lobes, respectively. Likewise, four large rolling members are disposed between the outer cam lobes, respectively. The crown gear supports these rolling members.

When the two shafts meet the same rotational resistance, drive power is distributed from the crown gear to the two shafts via the rolling members and the inner and outer cam lobes.

If one of the shafts meets a larger rotational resistance than that of the other one of the shafts, the rolling members are urged against one of the inner cam lobes and one of the outer cam lobes from the other one of the inner cam lobes and the other one of the outer cam lobes, resulting in a difference in phase in the one of the inner cam lobes and the one of the outer cam lobes. As a result, the two shafts are restricted from rotating at speeds with a rotational difference exceeding a given value.

The differential gear set forth above features that, in order for enhancing a power transmission performance between the crown gear and the two shafts, the cam lobes are radially formed in a doubled structure configuration. More particularly, the opposing outer cam lobes are displaced in phase from the opposing inner cam lobes at an angle of 45 degrees in a circumferentially peripheral direction, with the rolling members of two kinds being aligned in a radial direction and supported with the crown gear.

However, such a structure is apt to be extremely complicated and involves a large number of component parts. Also, a high assembling precision is required. In addition, the presence of the two kinds of rolling members disposed in the radial direction causes the power transmission member, composed of the casing halves and the crown gear, to have no choice but to be inevitably formed in a large diameter. This results in the differential gear with a large sized structure. To address such an issue, it is desired for the differential gear with the differential restricting function to enhance a power-distribution performance between the power transmission member and the two shafts while attaining a miniaturized structure through the use of a simplified construction.

SUMMARY OF THE INVENTION

According to the present invention, there is provided a differential gear in which drive power is distributed from a power transmission member to two follower shafts in such a manner as to permit the two follower shafts to rotate with a given rotational difference, the differential gear comprising, the power transmission member rotatable relative to the two follower shafts and internally formed with an inner space, two cam members disposed in the inner space in concentric relation with a rotational center line of the power transmission member to be rotatable with respect to one another and having cam lobes formed on respective opposing surfaces, the follower shafts provided to the two cam members in concentric relation with the rotational center line of the cam members, respectively, and a plurality of cam follower elements interposed between the two cam lobes to be moveable along the cam lobes and to be held in engagement with the power transmission member, wherein each of the two cam lobes is continuous in a circumferential peripheral direction with each cam lobe having a varying height in an axially longitudinal direction of the cam members, characterized in that the power transmission member has a cylindrical inner peripheral surface, defining the inner space, formed with a plurality of engagement grooves lying parallel with the two follower shafts, each of the cam follower elements are fitted to respective one of the engagement grooves so as to cause a longitudinal direction of the each cam follower element to be orientated in a rotational direction, and the cam follower elements have portions, protruding from the engagement grooves into the inner space, which are disposed between two cam lobes.

With such a structure, the differential gear of the present invention is operative to distribute drive power from the power transmission member to the two follower shafts via the cam follower elements and the two cam members even if the cam follower elements assume any positions with respect to the two cam lobes. Especially, since each of the cam follower elements is fitted to each of the engagement grooves of the power transmission member so as to have a longitudinal axis orientated in the rotational direction of the power transmission member, the power transmission member may have a reduced diameter, resulting in a miniaturization of the differential gear.

Each of the cam follower elements, according to the present invention, preferably comprises an elongated member composed of terminal spherical portions and the central constricted portion, or the two balls. The presence of the two balls enables the cam follower element to be formed in a further simplified structure, resulting in a reduction in cost of the differential gear.

Each of the engagement grooves, according to the present invention, has a width shorter than the total length of each of the cam follower elements or the length of the two side-by-side balls. The depth of the groove is preferably determined to have a size substantially half of the diameter of the spherical portion or the ball of each of the cam follower elements. Substantially half of the spherical portion or of the ball sticks out of the inner space side from the associated engagement groove. This sticking out portion is intervened between the two cam lobes.

BRIEF DESCRIPTION OF THE DRAWINGS

The present invention will be described in detail below, byway of example only, with reference to the accompanying drawings, in which.

DETAILED DESCRIPTION OF THE PREFERRED EMBODIMENTS

Figure 1:
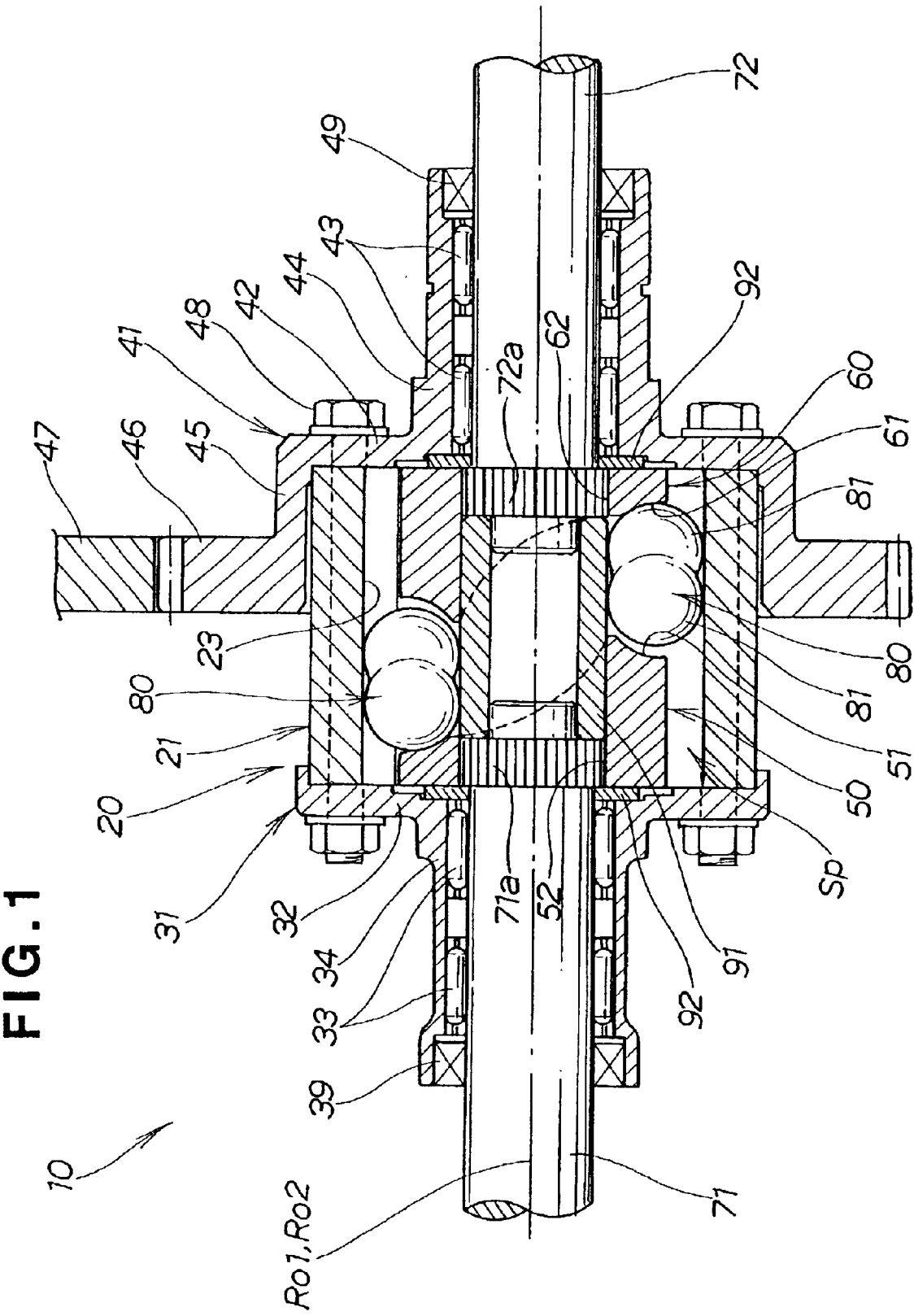
FIG. 1 is a cross sectional view illustrating a differential gear of an embodiment according to the present invention.

As shown in FIG. 1, a differential gear 10 is comprised of, as essential component parts, a rotatable power transmission member 20, two left and right cam members (a first cam member 50 placed at a left side in the figure and a second cam member 60 placed at a right side in the figure) disposed in an inner space Sp formed inside the power transmission member 20 in concentric relation with a rotational center line Ro1 thereof, left and right follower or driven shafts (a first follower shaft 71 placed at the right side in the figure and a second follower shaft 72 placed at the left side in the figure) mounted to the first and second cam members 50, 60, respectively, in concentric relationship with a rotational center line Ro2 of the first and second cam members 50, 60, and a plurality of cam follower elements 80 disposed between the first and second cam members 50, 60, and has a differential restrictive function.

The power transmission member 20 includes a rotary body composed of a cylindrical shape central casing portion 21 with both left and right ends being opened, a left casing half 31 which closes a left opening of the central casing portion 21, and a right casing half 41 which closes a right opening of the central casing portion 21.

The left casing half 31 includes a unitary formed product which is unitarily formed of a flat shape closure disc 32 which closes the left opening of the central casing portion 21, and a tubular boss portion 34 which rotatably supports the first follower shaft 71 via a plurality of bearings 33.

The right casing half 41 includes a unitary formed product which is unitarily formed of a flat shape closure disc 42 which closes the right opening of the central casing portion 21, a tubular boss portion 44 which rotatably supports the second follower shaft 72 via a plurality of bearings 43, an extended portion 45 which extends from the closure disc 42 so as to cover an outer periphery of the central casing portion 21, and a ring gear 46 formed at a distal end of the extended portion 45.

The ring gear 46 includes a spur gear which is held in mesh with a drive gear 47 to be driven with a drive power delivered from a power source (such as an electric motor or an engine) which is not shown.

The central casing portion 21, the left casing half 31 and the right casing half 41 have respective centers which are aligned with the rotational center line Ro1. Assembling the left casing half 31 and the right casing half 41 into a unitary structure by means of a plurality of fixture bolts 48 enables the inner space Sp to be defined inside the power transmission member 20. Reference numerals 39, 49 designate oil seals, respectively.

The first cam member 50 is coupled to the first follower shaft 71 through a splined connection. The second cam member 60 is coupled to the second follower shaft 72 through a splined connection.

Causing a tubular sleeve 91, with an outer diameter larger than that of the spline, to be interposed between left and right male splines 71a, 72a allows a space to be ensured between the first and second members 50,60. Further, ring shape friction plates 92, 92 are interposed between an internal surface of the closure disc 32 of the left casing half 31 and a rear surface of the first cam member 50 and between an internal surface of the closure disc 42 of the right casing half 41 and a rear surface of the second cam member 60, respectively.

Extremely minimal gaps may be provided between the rear surface of the first cam member 50 and the left friction plate 92 and between the rear surface of the second cam member 60 and the right friction plate 92, respectively.

The first and second cam members 50, 60 have cam lobes 51, 61 formed on respective surfaces which oppose with respect to one another. Hereinafter, the cam lobe 51 of the first cam member 50 is referred to as a "first cam lobe" and the cam lobe 61 of the second cam member 60 is referred to as a "second cam lobe". The cam follower elements 80 are interposed between the first and second cam lobes 51, 61.

Figure 2:
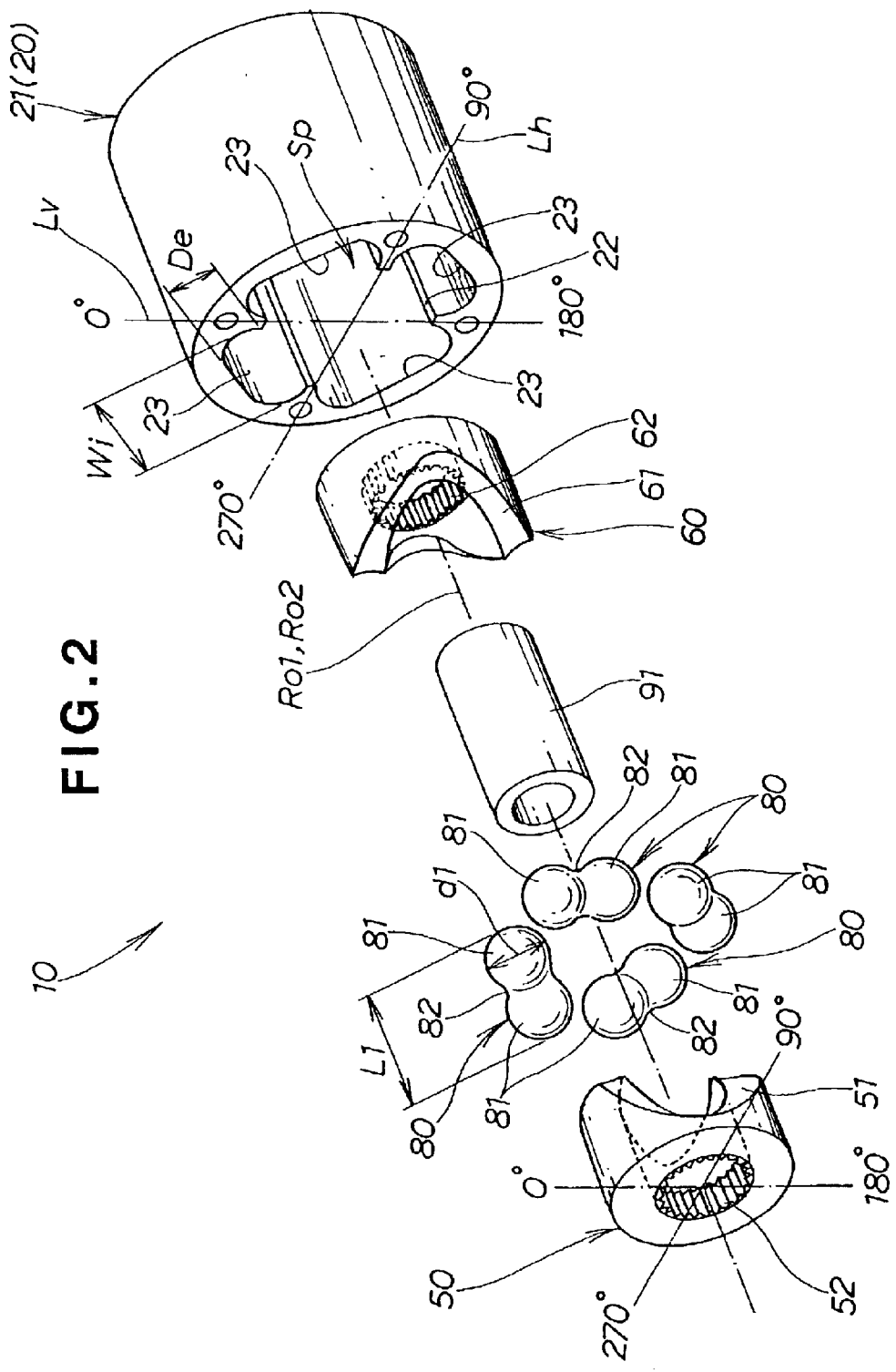
FIG. 2 is an exploded perspective view illustrating a power transmission member, two cam members and a plurality of cam follower elements shown in FIG. 1.

As shown in FIG. 2, the first and second cam members 50, 60 take the form of cylindrical members which are internally formed with female splines 52, 62, respectively. The first and second cam lobes 51, 61 are continuously formed on respective circumferential peripheries such that axially longitudinal heights of the cam lobes 51, 61 are varied along the circumferential peripheries. That is, the first and second cam lobes 51, 61 have concave and convex configurations with respect to the axially longitudinal direction of the first and second cam members 50, 60. The first cam lobe 51 has a shape formed in a point symmetry with respect to a center intersecting the rotational center line Ro1. Likewise, the second cam lobe 61 has a shape formed in a point symmetry with respect to the center intersecting the rotational center line Ro1. Thus, the first and second cam members 50, 60 include two components with mutually identical shapes in identical dimensions and are disposed in mutually facing relationship.

Each of the cam follower elements 80 has an entire shape of a peanut configuration which is composed of a unitarily formed elongated body including terminal spherical portions 81, 81 and a constricted portion 82. The terminal spherical portions 81, 81 are substantially true spheres and have the same diameters. The constricted portion 82 has a smaller diameter than that of the spherical portion 81 and serves as a joint portion between the terminal spherical portions 81, 81. In an exemplary embodiment shown in the figure, four pieces of cam follower elements 80 are interposed between the first and second cam members 51, 61.

The power transmission member 20 has a plurality of engagement grooves 23 which are formed on an inner circumferential periphery 22, at an area forming the empty space SP, of the central casing portion 21 in parallel (that is, parallel to the first and second follower shafts 71, 72 in FIG. 1) to the rotational center line Ro1. In an exemplary structure shown in the figure, the number of the engagement grooves 23 is selected to be four in compliance with the number of the cam follower elements 80. Each of the engagement grooves 23 has a width Wi which is smaller than a total length L1 of the cam follower 80. Each of the engagement grooves 23 has a depth De which is substantially half of a diameter d1 of the spherical portion 81.

Figure 3:
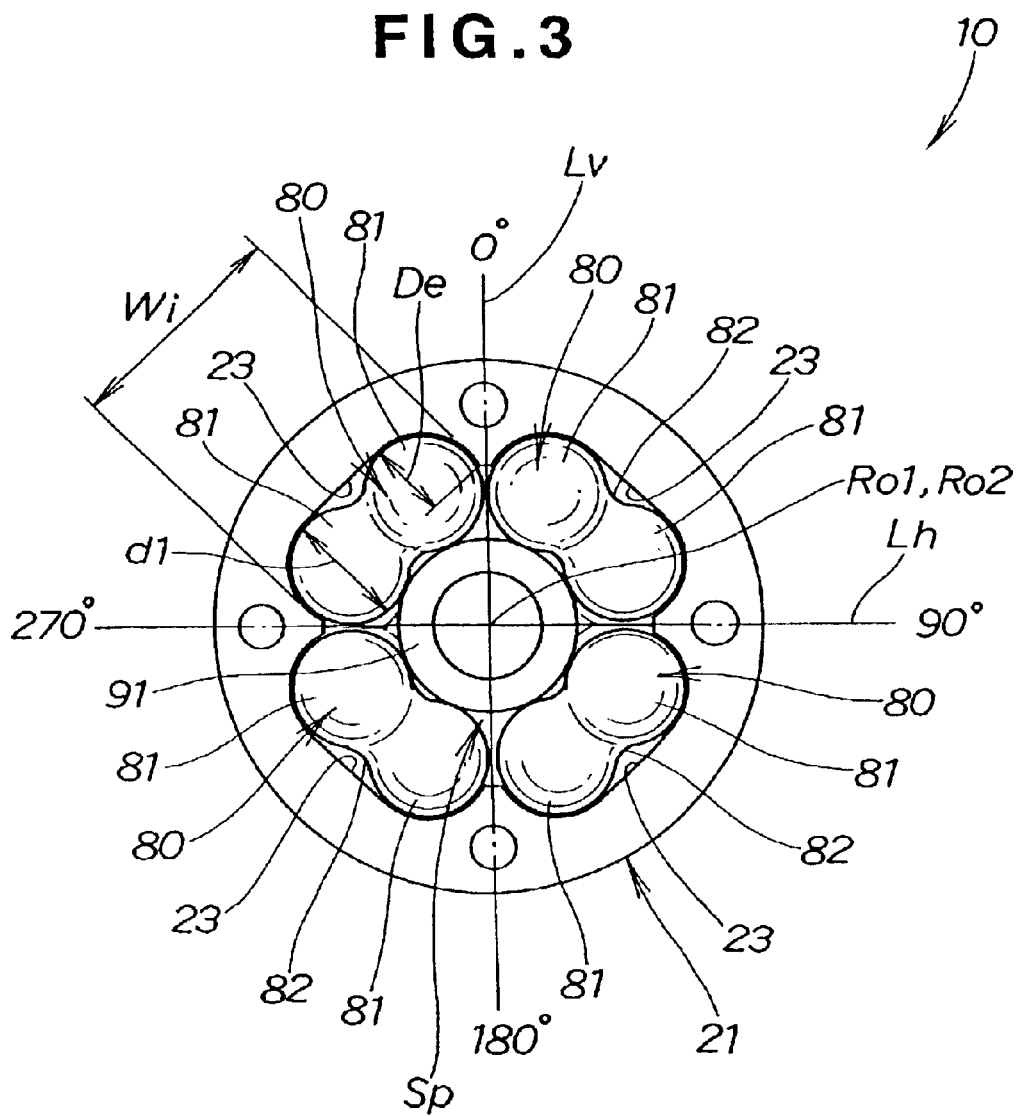
FIG. 3 is a schematic view illustrating a condition in which the cam follower elements are fitted to engagement grooves of the power transmission member shown in FIG. 2.

FIG. 3 shows a relationship between the central casing portion 21 and the cam follower elements 80. The cam follower elements 80 are individually fitted to the engagement grooves 23 such that the terminal spherical portions 81, 81 are orientated in a peripheral direction (rotational direction) of the central casing portion 21. These spherical portions 81, 81 partially protrude into the empty space Sp. In order for the protruding portions to be precluded from being moved into the empty space Sp, these protruding portions are restricted by an outer periphery of the sleeve 91. The cam follower elements 80 are fitted to the engagement grooves 23 under a condition in which the cam follower elements 80 are inclined in a direction (front and rear direction in the figure) along the rotational center line Ro1.

Relative rotation of each of these plural cam follower elements 80 is restricted with respect to the power transmitting member 20 (see FIG. 1), while being enabled to be moveable along each of the engagement grooves 23 in a parallel relationship relative to the rotational center line Ro1.

Here, let it be considered that, in the central casing portion 21, an azimuth indicated with a vertical line Lv and a horizontal line Lh passing across between the respective engagement recesses 23,23 in terms of the rotational center line Ro1 is expressed as 0°, 90°, 180° and 270° in a clockwise direction from the above.

Figure 4:
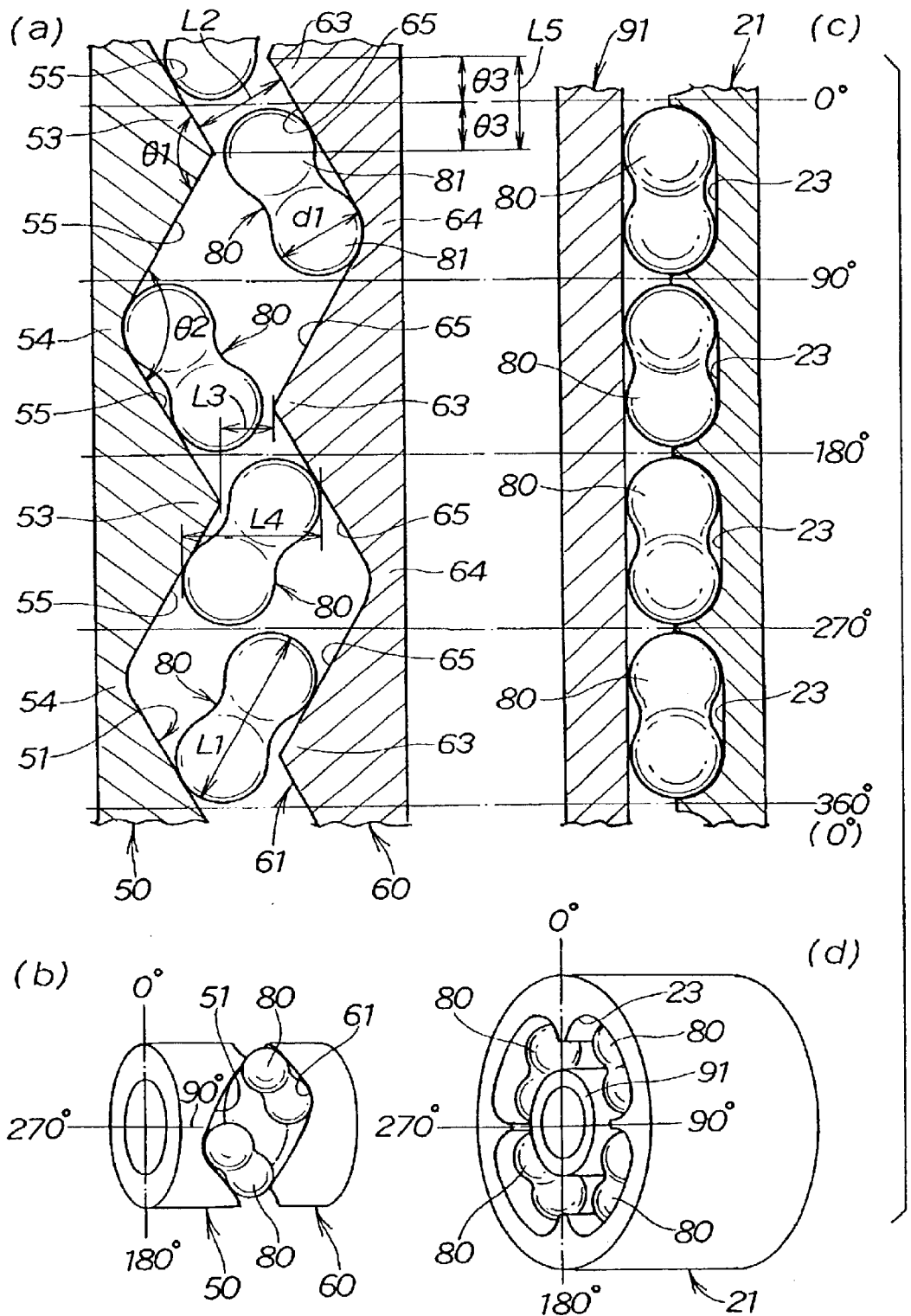
FIG. 4 illustrates relationships among a central casing portion, the first and second cam members and the cam follower elements according to the present invention.

(a) to (d) of FIG. 4 show the relationship among the central casing portion 21, the first and second cam members 50, 60 and the cam follower elements 80. (a) of FIG. 4 shows an exploded view illustrating the relationship between the first and second cam members 50,60 and the cam follower elements 80 shown in (b) of FIG. 4 when viewed from the outside. (c) of FIG. 4 shows an exploded view illustrating the relationship between central casing portion 21 and the cam follower elements 80 shown in (d) of FIG. 4 when viewed from a terminal end side.

The first and second cam lobes 51,61 are formed with two ridges 53, 63 and two roots 54, 64 in respective circumferential directions at intervals of 90°, respectively, such that the ridges and the roots are alternately arranged to form a ridge-root-ridge-root pattern. The ridges 53, 63 have apexes formed in rectangular shapes with sharp edges. The roots 53, 63 have bottoms with rounded shapes. Each of slanted surfaces 55, 65 joined between the apexes of these ridges 53, 63 and the roots 54, 64, respectively, is linear. An apex angle θ1 between the ridges 53, 63 and an expansion angle θ2 and the roots 54, 54 form obtuse angles of approximately 120°. The ridges 53, 63 of the first cam lobe 51 substantially face the roots 54, 64 of the second cam lobe 61.

Here, in conjunction with (a) and (c) of FIG. 4, the azimuths of the first and second cam lobes 51, 61 in terms of the engagement recesses 23 are determined in a manner as will be described below.

For the azimuths 0° and 180°, the ridge 53 of the first cam lobe 51 and the ridge 63 of the second cam lobe 61 are disposed in a reversed phase. For instance, for the azimuth 0°, the apex of the ridge 53 of the first cam lobe 51 is displaced by a phase angle of θ3 in a clockwise direction. On the other hand, for the azimuths 0°, the apex of the ridge 63 of the second cam lobe 61 is displaced by the phase angle of θ3 in a counter-clockwise direction. For instance, the phase angle of θ3 is determined to have a value of 22.5°.

The first and second cam lobes 51, 61 have the following dimensional relationship.

(i) In a position between the azimuths 0° and 180°, a distance L2 between the slanted surfaces 55, 65 is slightly larger in dimension than the diameter d1 of the spherical portion 81. That is, the distance L2 is determined to have a size to permit the elongated cam follower element 80, which is inclined as shown in (a) of FIG. 4, to be slidable along the slanted surfaces 55, 65 in the longitudinal direction of the cam follower element 80.

(ii) In a position between the azimuths 90° and 270°, a distance between the slanted surfaces 55, 65 is determined to have a dimension to permit the elongated cam follower element 80, which is inclined as shown in (a) of FIG. 4, to be slidable along the slanted surfaces 55, 65 in the longitudinal direction of the cam follower element 80.

(iii) A distance L3 between the apex of the ridge 53 ad the apex of the ridge 63 is smaller than the diameter d1 of the spherical 81 (i.e., L3<d1). Reasonably, the distance L3 is smaller than a width dimension L4 (width L4 in a lateral direction in the figure) of the cam follower element 80 which is inclined as shown in (a) of FIG. 4.

(iv) In a position between the azimuths 0° and 180°, a developed distance L5, corresponding to an angular value of two times the angle of θ3 (2×θ3), i.e., a distance L5 between the apex of the ridge 53 and the apex of the ridge 63 mutually adjacent to one another is equal to or substantially equal to the diameter d1 of the spherical portion 81.

The cam follower elements 80 are arranged with respect to the first and second cam lobes 51, 61 in such a manner as shown in (a) of FIG. 4. That is, in a region between the azimuths 0° and 180°, the cam follower element 80 is disposed in an inclined state such that both ends of the spherical portions 81, 81 are closer to the ridge 53 and the root 64, respectively. In a region between the azimuths 90° and 180°, the cam follower element 80 is disposed in parallel to the cam follower element 80 remaining between the azimuths 0° and 90°. In a region between the azimuths 180° and 270°, the cam follower element 80 is disposed in the inclined state such that both ends of the spherical portions 81, 81 are closer to the slanted surfaces 55, 65, respectively. That is, in the region between the azimuths 180° and 270°, the cam follower element 80 is disposed in a reversed orientation with respect to the cam follower element 80 remaining between the azimuths 0° and 90°. In a region between the azimuths 270° and 0°, the cam follower element 80 is disposed in parallel to the cam follower element 80 remaining between the azimuths 180° and 270°.

Turning now back to FIG. 1 once, a description is continued. This figure shows the spherical portions of the cam follower elements 80 with portions, protruding from the engagement grooves 23 into the empty space Sp, being intervened between the first and second cam lobes 51, 61 which are radially outwardly opened.

Thus, by causing the cam follower elements 80 to engage the power transmitting member 20 in the rotational direction, the drive power is distributed from the power transmitting member 20 to the first and second follower shafts 71, 72 via the cam follower elements 80 and the first and second cam members 50, 60, enabling a given rotational difference to be allowed between the first and second follower shafts 71, 72.

Now, the operation of the differential gear 10 set forth above is described below with reference to FIG. 1 and (a) to (d) of FIG. 5. Also, in order to provide an ease of understanding the description, the four cam follower elements 80 bear reference numerals "A", "B", "C" and "D" in a sequence starting from the phase of 0°.

Figure 5:
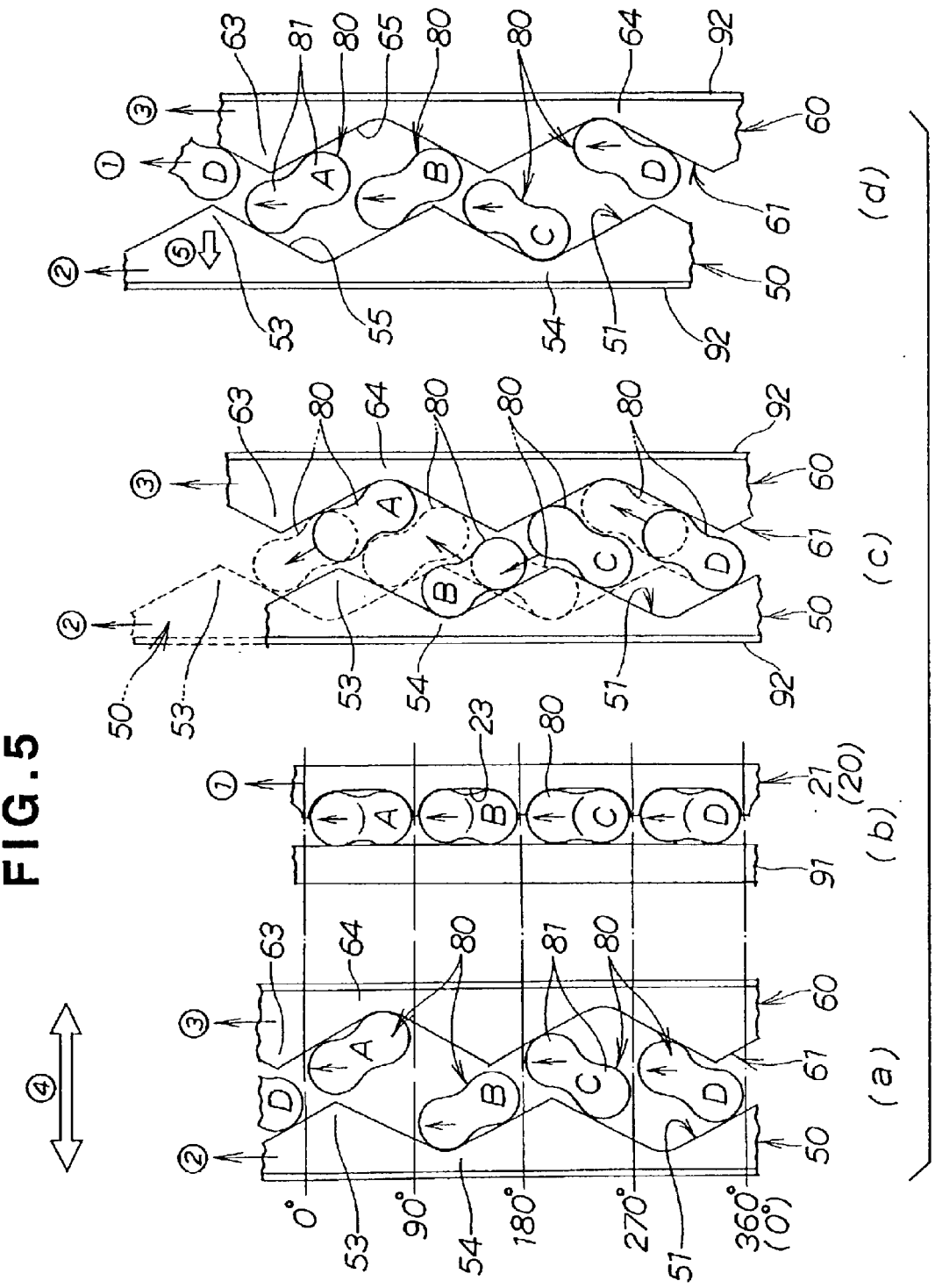
FIG. 5 illustrates a relationship between the two cam members and the cam follower elements.

First, a description is given, in conjunction with (a), (b) of FIG. 5 to a case in which the first and second follower shafts 71, 72 (see FIG. 1) are mutually exerted with the same rotational resistance. In such a case, there is no rotational difference between the first follower shaft 71 and the second follower shaft 72 like in the usual differential gear. For this reason, no rotational difference occurs between the first cam member 50 and the second cam member 60.

As the power transmitting member 20 rotates in a direction as shown by arrow 1, the cam follower elements 80 also rotate in the same direction to cause each of the spherical portions 81 to force the first and second cam lobes 51, 61 in the circumferentially peripheral direction. For example, the cam follower element "C" forces both of the first and second cam lobes 51, 61. As a result, the first and second cam members 50,60 are caused to rotate in the same direction (as shown by arrows 2, 3) as that of the power transmitting member 20 at the same rotational speed.

Subsequently, a description is given to a case where the second follower shaft 72 is subject to a larger rotational resistance than that of the first follower shaft 71. In such a case, the rotational difference occurs between the first follower shaft 71 and the second follower shaft 72. When this takes place, the second cam member 60 is subject to the same large rotational resistance (under a large load) as that of the second follower shaft 72. On the contrary, the first cam member 50 is subject to a small rotational resistance (under a light load).

Even in such a case, as shown in (a) and (b) of FIG. 5, when the power transmission member 20 is rotated in the direction as shown by the arrow 1, the cam follower elements 80 are rotated in the same direction, thereby causing the first and second cam lobes 51, 61 to be forced in the circumferentially peripheral direction. However, since the second cam member 60 is subject to the high load, the cam follower elements 80 are caused to slide in a direction as shown by arrow 4 along the second cam lobe 61, i.e., in the axially longitudinal direction of the first and second follower shafts 71,72. Stated another way, the cam follower elements 80 are caused to slide on the second cam lobe 61 rotating at a low speed while being rotated in the engagement grooves 23. As a result, some of the spherical portions 81 of the cam follower elements 80 contribute to force the first cam lobe 51, remaining under the light load, in the direction as shown by the arrow 2, thereby causing the first cam member 50 to rotate.

In such away, a position of the first cam lobe 51 relative to the second cam lobe 61 is varied in the direction as shown by arrow ②. In time the apex of the ridge 53 of the first cam lobe 51 passes across the apex of the ridge 63 of the second cam lobe 61. These results are shown in (c) and (d) of FIG. 5. In FIG. 5(c), a solid line represents a condition in which the first cam lobe 51 assumes an original position shown in (a) of FIG. 5, and a displaced condition is designated with a dotted line. (d) of FIG. 5 indicates a condition in which the first cam lobe 51 assumes the position indicated by a dotted line in (c) of FIG. 5.

By the way, as shown in (d) of FIG. 5, some of the spherical portions 81 of the cam follower elements 80 exert a force on the slanted surfaces 55 of the first cam lobe 51. For example, the cam follower element "A" forces both the first and second cam lobes 51, 61. As a result, the first cam member 50 is exerted with a thrust in a direction as shown by arrow 5. The first cam member 50 is responsive to this thrust and is urged against the friction plate 92 disposed at the inner wall side of the left casing end plate 31 (see FIG. 1). As a result, due to the frictional force occurring between the first cam member 50 and the friction plate 92, the first cam member 50 encounters a rotational resistance. This rotational resistance forms a differential restriction force.

(d) of FIG. 5 shows a condition in which, due to the differential restriction force, the rotation of the first cam member 50 relative to the second cam member 60 is restricted. As a result, the first and second follower shafts 71, 72 are restricted from being rotated at speeds with a difference exceeding a given value.

Under such a condition, the power transmitting member 20 and the cam follower elements 80 are further rotated in the direction as shown by the arrow ①, thereby causing the spherical portions 81 to force the first and second cam members 51,61 in the circumferentially peripheral direction. Specifically, the cam follower element "A" forces both the first and second cam lobes 51, 61. As a result, the first and second cam members 50,60 are caused to rotate at the same speed in the same direction (as shown by arrows ②, ③) as that of the power transmission member 20.

Subsequently, a description is given to a case in which the power transmission member 20 is rotated in a direction opposite the direction shown by arrow ①.

(i) When no rotational difference occurs between the first and second cam members 50, 60, specifically, the cam follower element "D" comes to force both the first and second cam lobes 51, 61.

(ii) When a rotational difference occurs between the first and second cam members 50, 60, specifically, the cam follower element "D" comes to force both the first and second cam lobes 51, 61.

From these actions, it appears that the number of the cam follower elements 80 may be four or a multiple of four. In compliance with such a concept, the number of the engagement grooves 23 may be the same as that of the cam follower elements. Further, the number of the ridges 53 and the roots 54 of the first cam lobe 51 and the number of the ridges 63 and the roots 64 of the second cam lobe 51 may be two or a multiple of two, respectively.

Now, a further operation of the differential gear 10 is described below with reference to FIGS. 2, 4 and 5.

As shown in FIG. 2, since the cam follower elements 80 include the terminal spherical portions 81 and the central constricted portion 82, respectively, there are no risks for the cam follower elements 80, even when formed in respective elongated members, to be hooked to the ridges 53, 63 (see FIG. 4), respectively. Consequently, the cam followers 80 are enabled to smoothly move in a path between the first and second cam lobes 51, 61.

As shown in FIG. 2, further, since the width Wi of each of the engagement grooves 23 is selected to be less than the total length L1 of the cam follower element 80, there is no change in the degree of inclination of each of the cam follower elements 80 even in a case in which the central casing 21 is rotated.

As shown in (a) of FIG. 4, the distance L3 between the ridges 53, 63 in the axially longitudinal direction is determined to be less than the width L4 of the inclined cam follower element 80. Further, the distance L2 between the apexes of the adjacent ridges 53, 63 in the circumferentially peripheral direction is designed to be substantially identical to the diameter d1 of the spherical portion 81.

As shown in FIG. 5, accordingly, at last one of the cam follower elements 80 are held in abutting engagement with the slanted surfaces 55, 65 of the first and second cam lobes 51,52 regardless of variations in phase between the first and second cam lobes 51, 52. That is, there is no probability for the cam follower 80 to negotiate or traverse the gap between the mutually facing ridges 53, 63.

When the central casing 21 is rotated in the direction as shown by arrow ①, the engagement recesses 23 serve to cause the cam follower elements 80 to rotationally move simply in the same direction as shown in (a) of FIG. 5, or to cause the cam follower elements 80 to be moved along the first and second cam lobes 51, 61 in the parallel relationship from the position shown by the solid line to the position shown by the dotted line as shown in (c) of FIG. 5.

From the foregoing description, it appears that, even when the cam follower elements 80 assume any position with respect to the first and second cam lobes 51, 61, the drive power can be distributed (to ensure a drive power distributing performance) from the power transmission member 20 to both of the first and second follower shafts 71, 72 via the cam follower elements 80 and the first and second cam lobes 51, 61. Also, such an advantage can be achieved in the simplified structure.

In addition, since the respective terminal spherical portions 81, 81 of the cam follower elements 80 are placed to be orientated in the rotational direction to permit the respective plural cam follower elements 80 to fit to the respective engagement grooves 23 of the power transmission member 20, the power transmission member 20 is able to be manufactured in the small diameter. This results in miniaturization of the differential gear 10.

Next, an exemplary use of the differential gear 10 of the structure set forth above is described below with reference to FIGS. 6 and 7.

Figure 6:
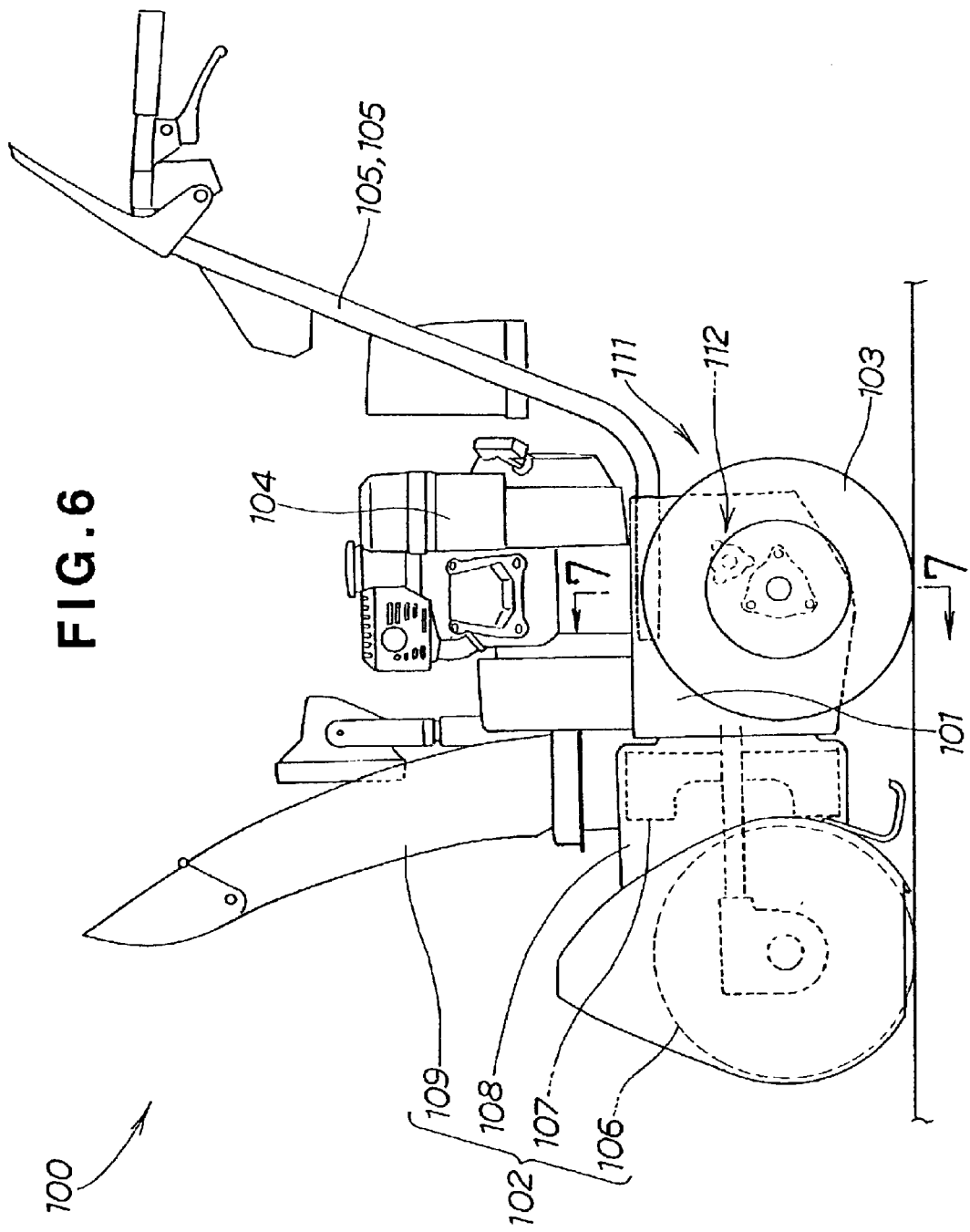
FIG. 6 is a side view of a snow removing machine showing an example which is applied with the differential gear of the embodiment according to the present invention.

FIG. 6 shows a snow removing machine employing the differential gear according to the present invention. The snow removing machine 100 is a self-propelled working machine which includes a snow removing section 102 mounted at a front portion of a body frame 101 whose rear portion carries drive wheels 103 for traveling. An engine 104 is mounted to an upper portion of the body frame 101. Left and right operating handles 105, 105 extend rearward from the body frame 101.

The snow removing section 102 includes an auger 106 which is driven with a drive source composed of the engine 104, a blower 107, a snow removing housing 108 and a shooter 109. Rotating the auger 106 with the drive power of the engine 104 to scrape and collect snow in a front and rear direction of the figure to be delivered to the blower 107 from which snow is discharged via the shooter 109 due to a centrifugal force.

Travel section 111 is comprised of an infinitely variable power transmission 112 connected to the drive source composed of the engine 104, and drive wheels 103. The drive power output is transmitted from the engine 104 to the drive wheels 103 via the infinitely variable power transmission 112, thereby causing the drive wheels 103 to be rotated.

Figure 7:
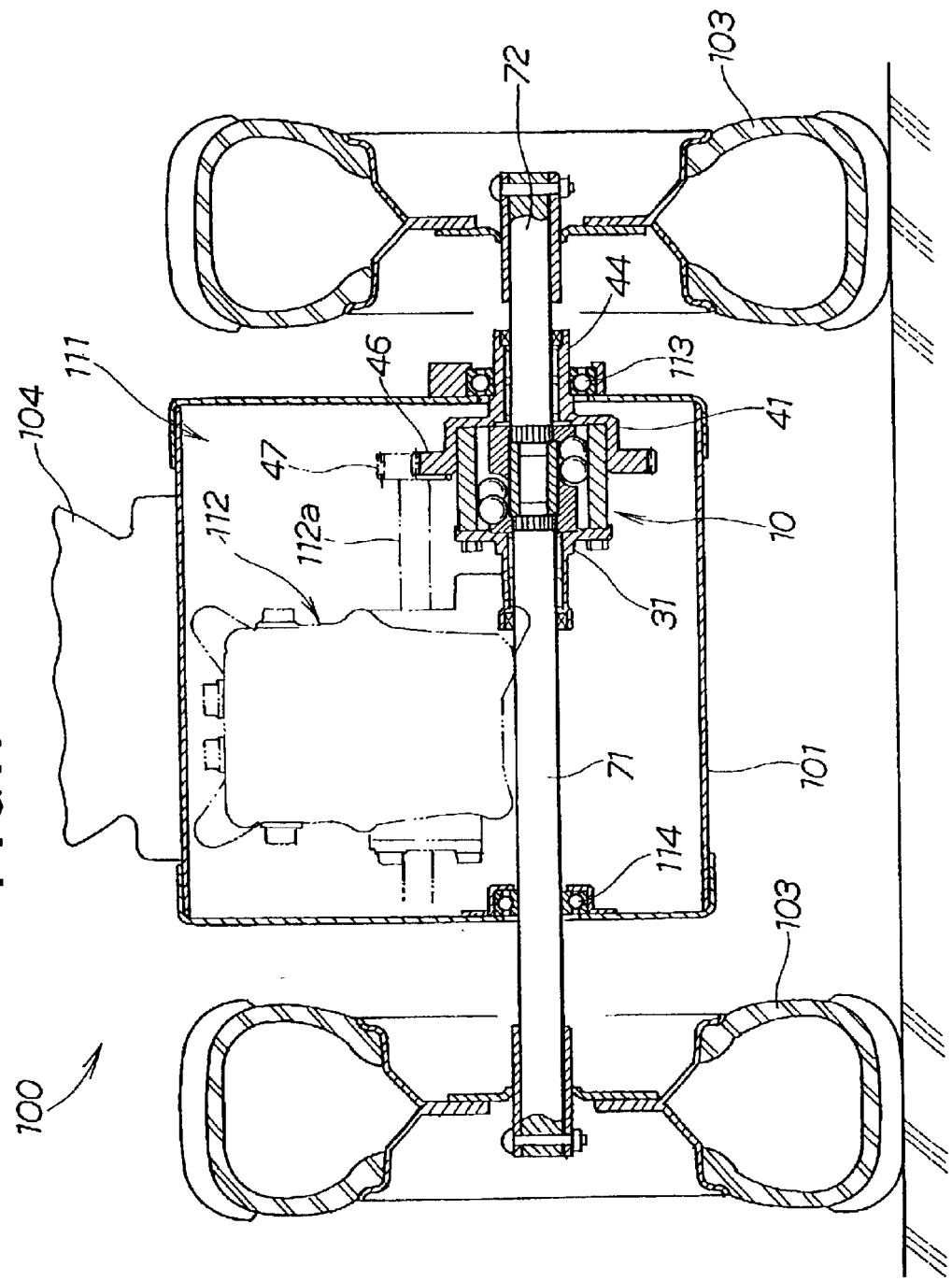
FIG. 7 is a cross sectional view taken along a line 7—7 of FIG. 6.

FIG. 7 shows a condition in which the differential gear 10 according to the present invention is interposed between the infinitely variable power transmission 112, which is shown in a phantom line, and drive wheels 103,103. More particularly, the boss portion 44 of the casing right half portion 41 is rotatably supported with the body frame 101 via a bearing 113, and the first follower shaft 71 is rotatably supported with the body frame 101 via a bearing 114 such that the ring gear 46 of the differential gear 10 is held in mesh with the drive gear 47 formed at an output shaft 112a of the infinitely variable power transmission 112, with the first and second follower shafts 71,72 being coupled to the drive wheels 103,103, respectively.

Thus, by adopting the differential gear 10 of the present invention to the snow removing machine, it is possible for the differential gear 10 to restrict the rotational difference between the drive wheels 103, 103 from exceeding the given value when one drive wheel 103 runs idle or undergoes a larger resistance than the other drive wheel 103 owing to road surface conditions.

Next, another embodiment of the differential gear shown in FIGS. 1 to 5 is described below with reference to FIGS. 8 and 9. Like parts bear the same reference numerals as those of the differential gear 10 of the embodiment shown in FIGS. 1 to 5 to omit redundant description.

Figure 8:
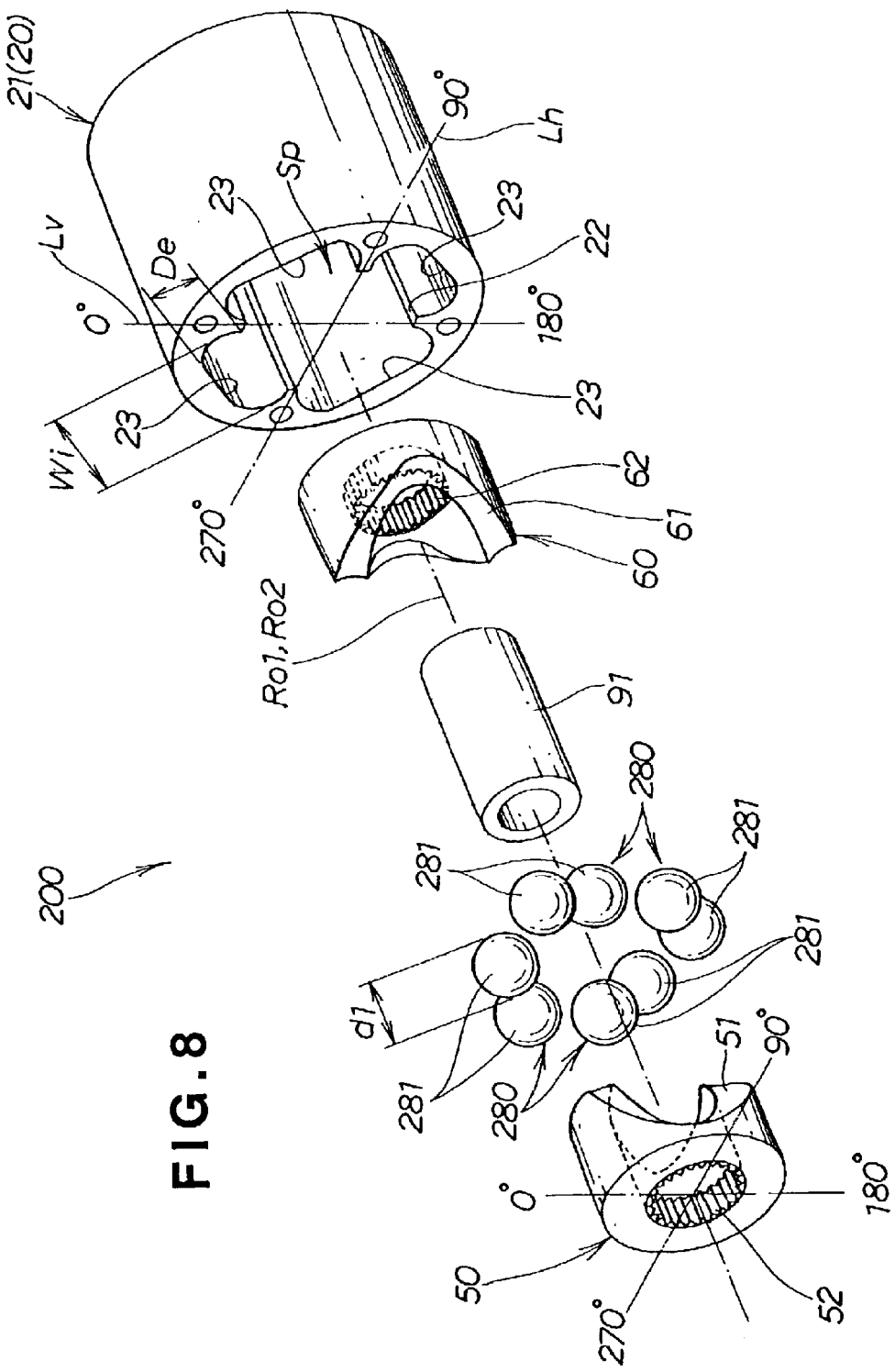
FIG. 8 is an exploded view, which corresponds to FIG. 2, of a differential gear of the other embodiment according to the present invention.

A differential gear 200 of a modified form shown in FIG. 8 features that cam follower elements 280 which include two balls 281,281, respectively. Each ball 281 has a diameter equal to the diameter d1 of the spherical portion 81 of the cam follower element shown in FIG. 2. The total length of the two side-by-side balls 281,281 is substantially equal to the total length L1 of the cam follower member 80 shown in FIG. 2.

The width Wi of each of the engagement grooves 23 of the central casing portion 21 is smaller than the length of the side-by-side balls 281,281, i.e., a product of two times the diameter d1 of the ball 281 (as expressed by Wi<2×d1). The depth De of each of the engagement grooves 23 has a value equal to substantially half of the diameter d1 of the ball 281.

Further, the differential gear 200 of this embodiment has a structure in which the two balls 281,281 are individually fitted to the engagement recesses 23, respectively, to be orientated in the rotational direction in the side-by-side relationship, with portions of the balls 281,281 protruding from the engagement recesses into the empty space Sp interposed between the first and second cam lobes 51, 61 which are opened radially outward.

Figure 9:
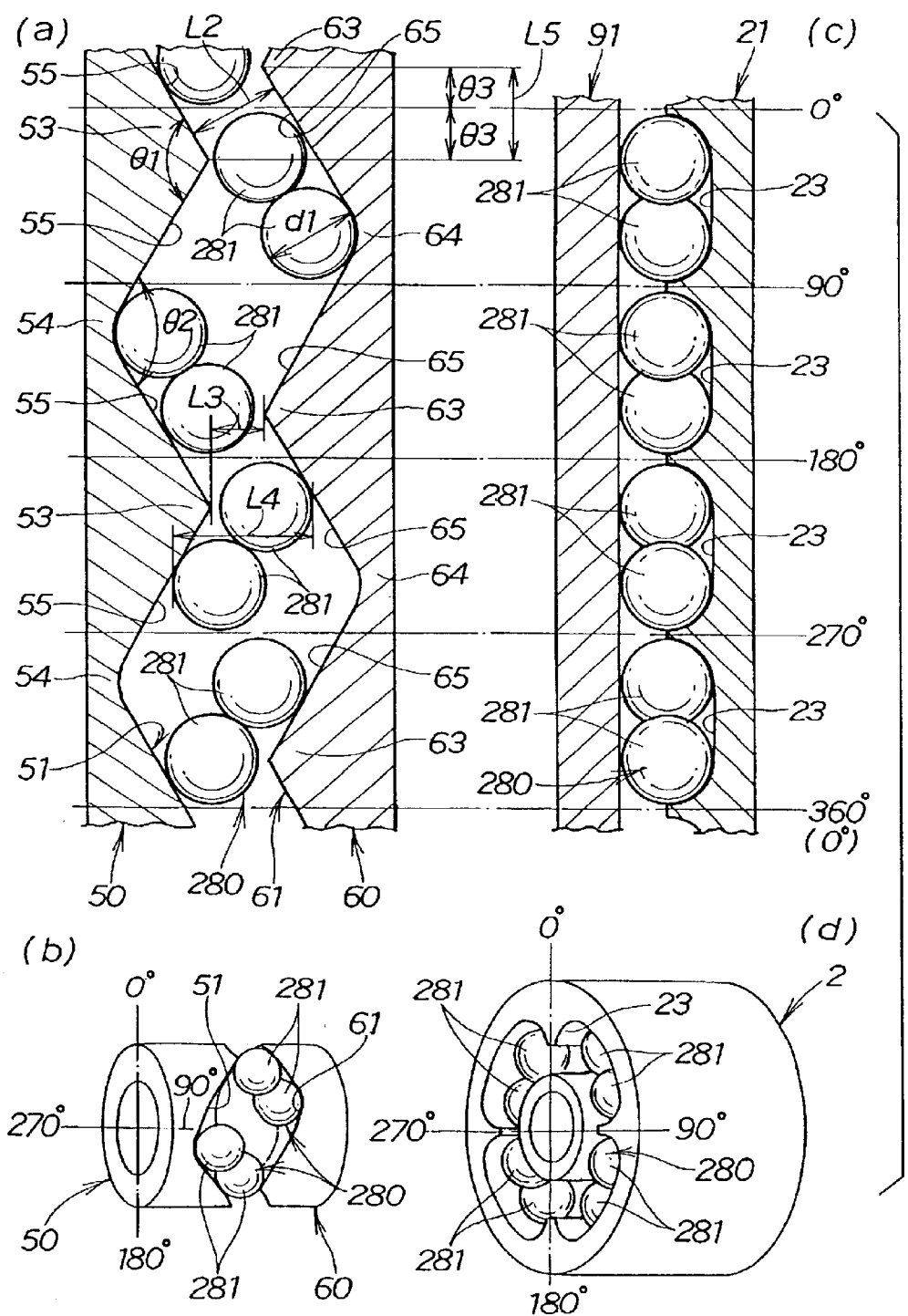
FIG. 9 illustrates a relationship among a central casing portion, the first and second cam members and the cam follower elements of the differential gear of the other embodiment shown in FIG. 8.

(a) to (d) of FIG. 9 show the relationship among the central casing portion 21, the first and second cam members 50,60 and the cam follower elements 280. (a) of FIG. 9 shows the relationship between the first and second cam members 50,60 and the cam follower elements 280, which are shown in (b) of FIG. 9, in a developed state. (c) of FIG. 9 shows the relationship between the central casing portion 21 and the cam follower elements 280, which are shown in (d) of FIG. 9, in a developed state.

The cam follower elements 280 are disposed relative to the first and cam lobes 51, 61 in such a way shown in (a) of FIG. 9. That is, the cam follower elements 280 are disposed in the same arrangement as those of the cam follower elements 80 shown in FIG. 4. The respective balls 281 of the cam follower elements 280 of this embodiment play the same rolls as those of the respective spherical portions 81 of the cam follower elements 80 of the embodiment shown in FIG. 4.

The distance L3 between the apex of the ridge 53 and the apex of the ridge 63 is smaller than the total size L4 (a width L4 in a lateral direction as viewed in the figure) of the two side-by-side balls 281,281 remaining in an inclined state as shown in (a) of FIG. 9.

Since the differential gear 200 of the embodiment shown in FIGS. 8 to 9 has the same fundamental operation and advantages as those of the differential gear 10 of. the embodiment shown in FIGS. 1 to 5, a description of the same is herein omitted. The differential gear 200 of the FIGS. 8 to 9 embodiment has a further advantage described below.

The cam follower elements can be constructed by arranging an even number of balls 281. For this reason, the cam follower element 280 may have a simpler structure than that of the cam follower element 80 of the differential gear 10 of the embodiment previously described above. Accordingly, it is possible for the differential gear 200 to be reduced in cost.

Further, the differential gears 10, 200 of the above two embodiments may not be limited to be used in the snow removing machine and may be applied to other various machines involving working machineries such a lawn mower and a transport vehicle, industrial machineries, automotive vehicles and ships.

The present disclosure relates to the subject matter of Japanese Patent Application No. 2001-312497, filed Oct. 10, 2001, the disclosure of which is incorporated herein by reference in its entirety.

What is claimed is:

1. A differential gear in which drive power is distributed from a power transmission member to two follower shafts in such a manner as to permit the two follower shafts to rotate with a given rotational difference, the differential gear comprising:

a power transmission member rotatable about an axis of rotation relative to two follower shafts and having an inner peripheral surface defining an inner space;

two cam members disposed in the inner space so as to be rotatable with respect to one another and having cam lobes formed on respective opposing surfaces;

the two follower shafts and the two cam members being in concentric relation with, and rotatable about, the axis of rotation; and a plurality of cam follower elements interposed between the two cam lobes to be movable along the cam lobes and to be held in engagement with the power transmission member;

wherein each of the two cam lobes is continuous in a circumferential peripheral direction with each of the cam lobes having a varying height in an axially longitudinal direction of the cam members;

wherein the power transmission member has on the inner peripheral surface thereof a plurality of engagement grooves extending in a direction parallel to the axis of rotation;

wherein each of the cam follower elements is fitted to a respective one of the engagement grooves so as to cause a longitudinal direction of the each cam follower element to be orientated in a rotational direction of the power transmission member; and wherein the cam follower elements have portions which protrude from the engagement grooves into the inner space and which are disposed between the two cam lobes.

2. A differential gear according to claim 1; wherein each of the plural cam follower elements comprises an elongate cam follower element having terminal spherical portions and a central constricted portion.

3. A differential gear according to claim 2; wherein a width of each of the engagement grooves is shorter than a total length of each of the cam follower elements.

4. A differential gear according to claim 2; wherein a depth of each of the engagement grooves has a size of substantially half of a diameter of the spherical portion of each of the cam follower elements.

5. A differential gear according to claim 1; wherein each of the cam follower elements includes two balls.

6. A differential gear according to claim 5; wherein a width of each of the engagement grooves is shorter than a combined length of the two balls.

7. A differential gear according to claim 5; wherein a depth of each of the engagement grooves has a size of substantially half of a diameter of the ball of each of the cam follower elements.

8. A differential gear according to claim 5; wherein the two balls are fitted to the engagement grooves in a side-by-side relationship in a rotational direction of the follower member.

9. A differential gear according to claim 1; wherein each of the cam follower elements comprises an elongate cam follower element received in a respective one of the engagement grooves such that a longitudinal axis of the elongate cam follower element is inclined with respect to the axis of rotation.

10. A differential gear according to claim 9; wherein the elongate cam follower elements are slidably received in the engagement grooves so as to be slidably movable therealong in a direction parallel to the axis of rotation during a power-transmitting operation of the differential gear.

11. A differential gear according to claim 1; further including a sleeve interposed between opposed ends of the two follower shafts for restricting movement of the cam follower elements in a radial inward direction.

* * * * *